United States Patent [19]

Freeman

[11] Patent Number: 5,550,959
[45] Date of Patent: Aug. 27, 1996

[54] TECHNIQUE AND SYSTEM FOR THE REAL-TIME GENERATION OF PERSPECTIVE IMAGES

[75] Inventor: Kyle G. Freeman, Woodland Hills, Calif.

[73] Assignee: Novalogic, Inc., Calabasas, Calif.

[21] Appl. No.: 68,428

[22] Filed: May 27, 1993

[51] Int. Cl.$^6$ .................................................. G06T 15/20
[52] U.S. Cl. ........................................... 395/127; 395/139
[58] Field of Search .................................... 395/127, 119, 395/120, 135, 123, 130, 121, 139

[56] References Cited

U.S. PATENT DOCUMENTS

| | | | |
|---|---|---|---|
| 4,583,185 | 4/1986 | Heartz | 395/121 |
| 4,586,038 | 4/1986 | Sims et al. | 395/130 |
| 4,609,917 | 9/1986 | Shen | 395/121 |
| 4,721,952 | 1/1988 | Huber | 395/119 |
| 4,752,828 | 6/1988 | Chapuis et al. | 348/580 |
| 4,775,946 | 10/1988 | Anjyo | 395/119 |
| 4,791,579 | 12/1988 | Kranitzky | 395/120 |
| 4,855,937 | 8/1989 | Heartz | 395/121 |
| 4,974,177 | 11/1990 | Nishiguchi | 395/125 |
| 5,179,638 | 1/1993 | Dawson et al. | 395/125 |
| 5,243,665 | 9/1993 | Maney et al. | 382/152 |
| 5,307,450 | 4/1994 | Grossman | 395/123 |
| 5,317,689 | 5/1994 | Nack et al. | 395/163 |

OTHER PUBLICATIONS

Kovtonyuk et al, "Generation of a three-dimensional image and holography of noncompact objects," Abstract, 1989.
Foley et al., Computer Graphics: Principles and Practice, 1990, pp. 672, 835, 836 1990.
Foley et al, "Fundamentals of Interactive Computer Graphics", 1984, pp. 6, & 267–272.

*Primary Examiner*—Mark K. Zimmerman
*Assistant Examiner*—Anton W. Fetting
*Attorney, Agent, or Firm*—Fulwider Patton Lee & Utecht

[57] ABSTRACT

A technique and system for the real-time computation of visual scenes reduces the three-dimensional computation to two additions and further reduces the need for three-dimensional computations by displaying several screen pixels per three-dimensional computation. The approach when implemented in hardware or software significantly speeds up scene generation time. From a two-dimensional array of elevations a series of cross-sections perpendicular to the observer are constructed. For each elevation within the cross-section, a series of screen pixels is drawn. The next array element in the cross-section is found by adding a value to both indexes in the two-dimensional array.

9 Claims, 4 Drawing Sheets

FIG. 1
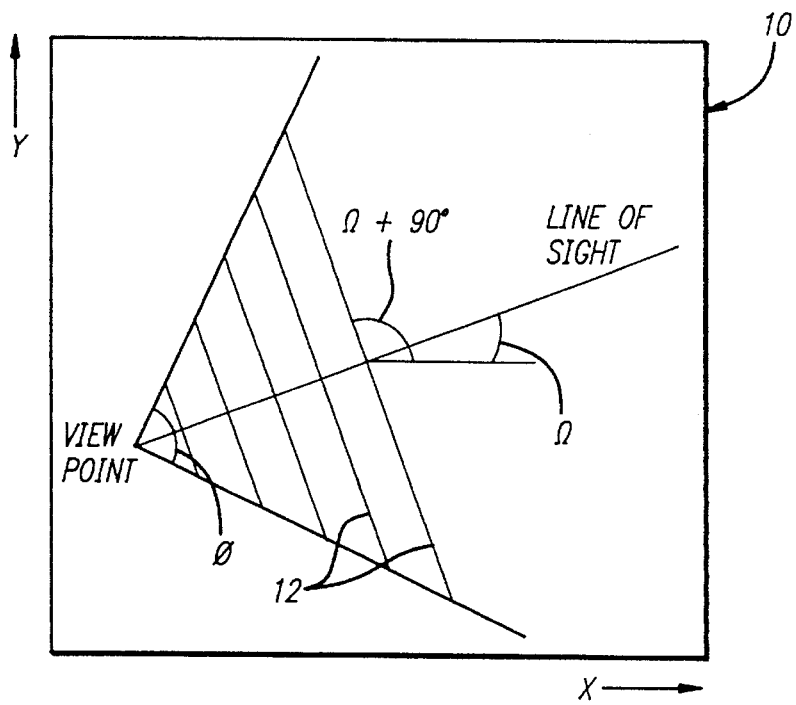
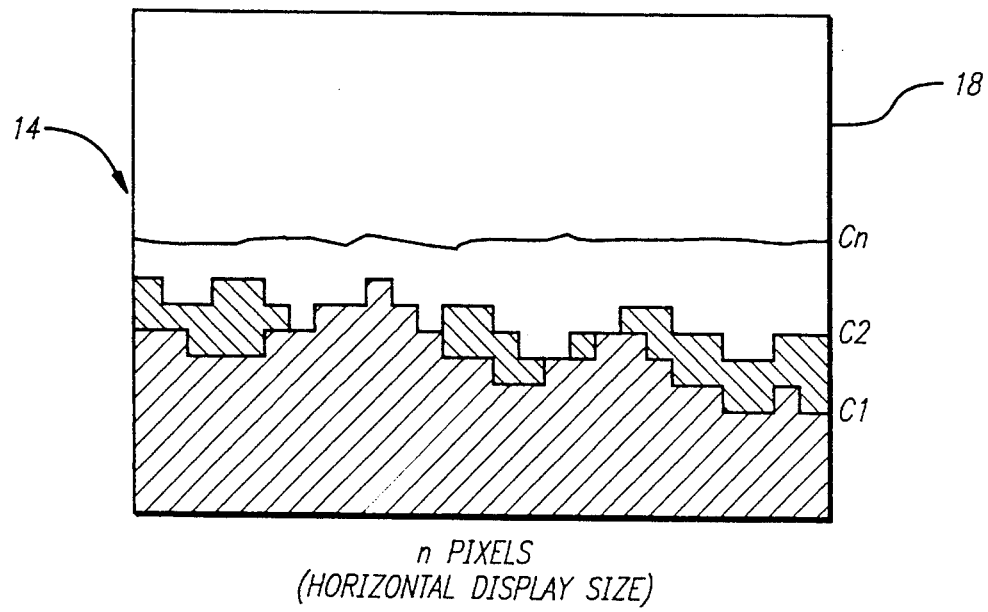
n PIXELS
(HORIZONTAL DISPLAY SIZE)
FIG. 2

TECHNIQUE AND SYSTEM FOR THE REAL-TIME GENERATION OF PERSPECTIVE IMAGES

FIELD OF THE INVENTION

This invention generally relates to a technique and system for the generation of images on a display device, and more particularly to real-time computer simulation of visual images of perspective scenes such as landscapes and seascapes.

BACKGROUND OF THE INVENTION

The principal application area for computer image generation has been that of visual training and/or entertainment simulators which present scenes to a trainee or game player (the operator) that allow him to practice some task such as flying an airplane. In a flight simulator, a three-dimensional model of the desired "gaming area" is prepared and stored in the computer. This model is called the visual data base. The visual simulator combines an image generator with a display device such as a cathode ray tube (CRT) or liquid crystal display (LCD). The image generator converts the three-dimensional visual data base into a two-dimensional scene for display on the display device. The generated imagery is meant to be representative of the true scenes that the operator would see if the operator were actually performing the task being simulated. The generation of display images is said to be in "real time" if the images are updated fast enough to give a sense of motion.

Real-time generation of visual scenes is usually a compromise between realism and the cost of the hardware. What has been needed is a technique for real-time generation of visual displays without sacrificing realism or requiring expensive hardware.

SUMMARY OF THE INVENTION

It is therefore an object of the present invention to provide a unique computer generated real-time display wherein the hardware requirements are greatly simplified or wherein the speed and realism of the display is greatly enhanced.

The objects of the invention are accomplished by a process that replaces the complex three-dimensional computations of the laborious "bore-site" or "ray-traced" methods with merely two additions (average) per three-dimensional point. A series of cross-sections perpendicular to the observer's line of sight are drawn that overlap to form a complete scene. In order to provide perspective, the scale of each cross-section changes with the distance from the observer. Thus each cross-section is drawn with a scale value dependent on its distance from the observer. Though various means of accomplishing occulting may occur to one skilled in the art, the preferred embodiment of the present invention contemplates occulting by simply overdrawing the previous cross-section. The orientation of the observer is combined with the scale of the cross-section to form a two-dimensional vector. The cross-section is drawn by following the vector through the two-dimensional elevation array and plotting visible points. The position and number of cross-sections is pre-determined and stored in a table. More cross-sections produce a higher quality image, but take more time to render.

DESCRIPTION OF THE DRAWINGS

FIG. 1 is a representation in plan view of the gaming area, representing a virtual observer's location and heading therein;

FIG. 2 is a representation of a plurality of cross-sections according to the present invention as might be seen on a display screen;

DETAILED DESCRIPTION OF THE PREFERRED EMBODIMENT

Figure 3:
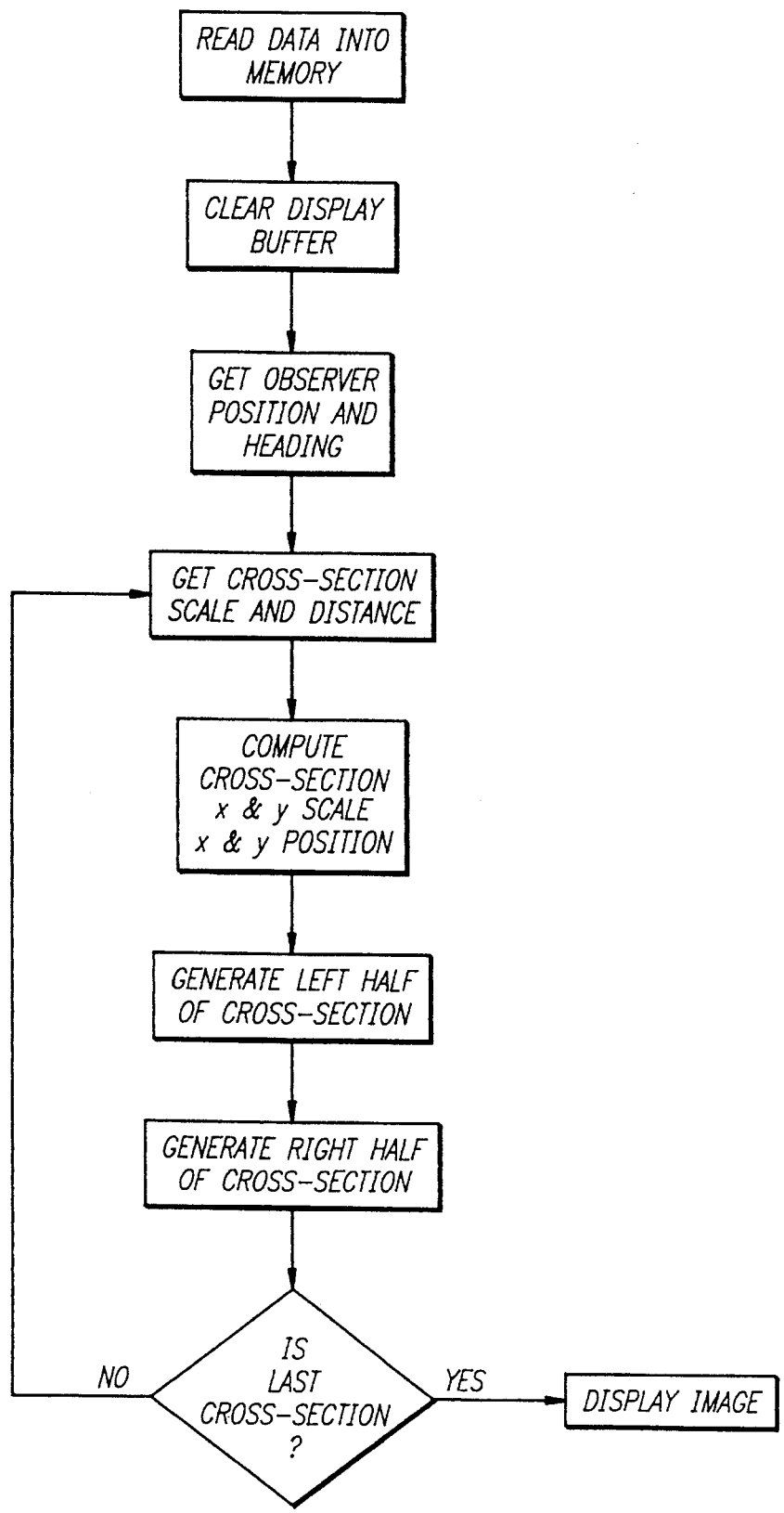
FIG. 3 is a block diagram of the image generator of the present invention.

The real-time generation of perspective scenes reflective of a virtual observer's movement through given terrain is a critical need for aviation and ground simulation trainers and many types of computer games. In order to minimize the number and complexity of the required calculations, the present invention provides an algorithm for generating perspective scenes using data bases such as the elevation grid data bases produced by the Defense Mapping Agency. Such data bases are described more fully in U.S. Pat. No. 4,583,185 to Robert A. Heartz.

The technique according to the present invention may be illustrated with reference to FIGS. 1 and 2. Observer (virtual) location and heading with respect to the elevation data base are obtained. The scene is generated by sequentially generating a series of "slices" or cross-sections at ninety degrees to the observer's line of sight. Adjustment is made for the observer's altitude. Each cross-section is horizontally scaled to render the observer's field of view, and vertically scaled to render perspective. For each point in a given cross-section, a vertical line is drawn to the respective scaled height. After a pre-selected number of cross-sections have been generated, the scene is displayed.

In FIG. 1 there is represented a visual data base 10. The visual data base 10 contains an array of discrete points, denoted by the Cartesian coordinates X and Y. The visual data base 10 constitutes the gaming area for computer game play. The data contained in the visual data base 10 may be derived, as indicated above, from terrain mapping provided by the Defense Mapping Agency, or it may be created by, for example, a computer game designer. Each point X,Y in the visual data base 10 has assigned to it elevation data. In a preferred embodiment, each such point also has assigned to it color data. Either or both altitude or color information may be generated at the time of use or prior to the time of use from hardware or software generators. It should noted that the two attributes described, i.e., elevation and color, are the most obvious to use in light of the state of the art. However, other attributes, such as texture, friction, or viscosity, can similarly be used by one skilled in the art. And any such attribute may be generated or stored in a memory as described.

A virtual observer, whose field of view will be represented on the display 'screen presented to an actual operator (not shown), may move about in the visual data base 10. FIG. 1 represents an observer capable of moving with four degrees of freedom, denoted by coordinates X, Y, Z (not shown in the plan view) and $\Omega$, where Z represents the observer's height, and $\Omega$ represents the observer's heading and line of sight.

The observer may change his heading by rotations about a vertical axis, but no rotation about horizontal axes is allowed in this embodiment of the invention. (In aviation terminology, this embodiment accommodates yaw but neither roll nor pitch.) It should be understood, however, that additional degrees of freedom could be accommodated in accordance with the present invention.

In FIG. 1 the observer's position in relation to the X-, Y- and Z-dimensions is randomly indicated to be at coordinates X,Y,Z with reference to the visual data base 10. The observer's heading is randomly selected to be $\Omega$ degrees, the angle being determined according to the convention for polar coordinates. Also shown are a representative number of cross-sections 12 drawn within the observer's field of view, which field of view is represented by the angle $\theta$ in FIG. 1. Each cross-section 12 is perpendicular to the observer's heading. The cross-sections 12 shown are few, but in practice the number may be selected by the system designer with regard to the interplay between speed and resolution. More cross-sections will give greater resolution but less speed, and vice versa.

Figure 5:
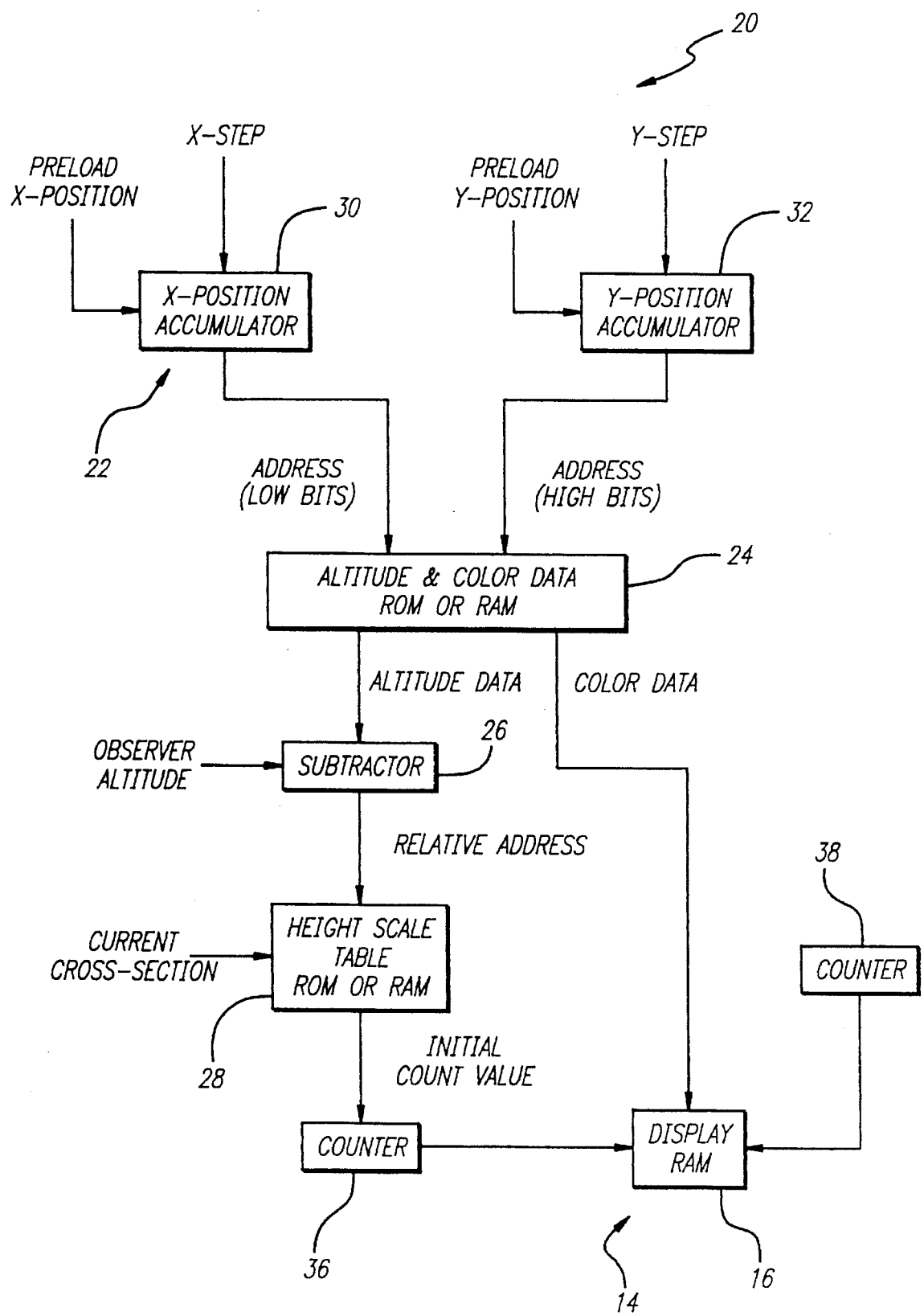
FIG. 5 is a block diagram of a hardware implementation of the image generator of the present invention.

FIG. 5 shows a hardware implementation of the computation box of the flow chart of FIG. 3. More particularly, there is shown display means 14 comprising a display buffer 16 and a display screen 18. The display screen 18 comprises 256×256 pixels, i.e., 256 rows× 256 columns. Represented as an image on the display screen 18 is a view such as an operator might have at a given instant of simulation or game play. Three horizon lines representative of three cross-sections 12 are pictured in FIG. 2, which horizon lines are identified as $c_1$, $c_2$, and $c_n$. It should be appreciated that the screen dimensions given are selected merely for purposes of illustration of the invention, and are nowise limiting. The horizon lines $c_1$, $c_2$, and $c_n$ represent various topographical features, as they might appear on the display screen 18, according to the data stored in the visual data base 10.

Turning now to FIG. 5, there is shown a block diagram of a hardware implementation 20 of the present invention. It should be observed that the invention can be implemented in various ways, as, for instance, by a general purpose computer programmed to provide the following logic/circuit elements or by a special purpose computer which is hard-wired to provide said elements. In this preferred embodiment of the present invention, a special purpose computer (not shown) is hardwired to provide the following computer elements: (i) address means 22 responsive to observer positional data and incremental X- and Y-steps for generating a value corresponding to the data base address of elevation data from the visual data base 10; (ii) memory means 24 responsive to said value corresponding to the data base address of elevation data for generating instantaneous elevation data; (iii) subtractor means 26 responsive to said instantaneous elevation data and observer height data for generating a value corresponding to the difference between observer height and terrain elevation; and (iv) vertical scaling means 28 responsive to said value corresponding to the difference between observer height and terrain elevation for supplying a column signal to the display means 14.

More particularly, the address means 22 responsive to observer positional data and incremental X- and Y-steps for generating a value corresponding to the data base address of elevation data comprises first and second accumulators 30 and 32, respectively. The first accumulator 30 is pre-loaded with the observer's X-position from the visual data base 10. The second accumulator 32 is pre-loaded with the observer's Y-position from the visual data base 10. Both accumulators 30 and 32 are 16-bit devices. They each generate 8-bit address information in response to 16-bit X or Y positional data. Taken together, the first and second accumulators 30 and 32 which comprise the address means 22 generate, in response to observer positional data and incremental X- and Y-steps, a value corresponding to the data base address of the requisite elevation data.

The memory means 24 responsive to said value corresponding to the data base address of elevation data for generating instantaneous elevation data comprises a 65K× 16-bit array, which may be either ROM or RAM. The memory means 24 contains elevation (altitude) and color map information wherein a given X,Y coordinate defines a particular elevation and a particular color. The memory means 24 receives two 8-bit inputs from the first and second accumulators 30 and 32. These two inputs taken together provide a 16-bit address to access the memory means 24. Responsive thereto, the memory means 24 generates two 8-bit outputs. The first output provides altitude information to 8-bit subtractor means 26. The second provides 8-bit color information to 64K×8-bit display means 14.

The subtractor means 26, responsive to said instantaneous elevation data and observer height data for generating a value corresponding to the difference between observer height and terrain elevation, subtracts the altitude signal received from the memory means 24 from the observer altitude. The remainder of the subtraction operation provides an 8-bit address signal which is supplied to the vertical scaling means 28. The vertical scaling means 28 comprises, in the embodiment shown, a 64K×8-bit ROM look-up table. However, those skilled in the art will recognize that the vertical scaling could be accomplished in other ways, for instance, by a functional, run-time approach. The vertical scaling means 28 is pre-loaded with a height scale table. In response to both the 8-bit signal received from the subtractor means 26 and an 8-bit signal indicating current cross-section, the vertical scaling means 28 provides an 8-bit output signal to a first, 8-bit, counter 36.

As stated above, the display means 14 comprises the display buffer 16 and the display screen 18 (shown in FIG. 2 but not in FIG. 5). The display means additionally comprises a second counter 38. In the preferred embodiment of the hardware implementation 20, the first counter 36 serves as a column counter, and the second counter 38 serves as a row counter in regard to the display means 14.

The display means 14 receives three input signals: the 8-bit output of the first counter 36; the 8-bit output of the memory means 24, which signal provides color information; and an 8-bit signal from the second counter 38.

Figure 4:
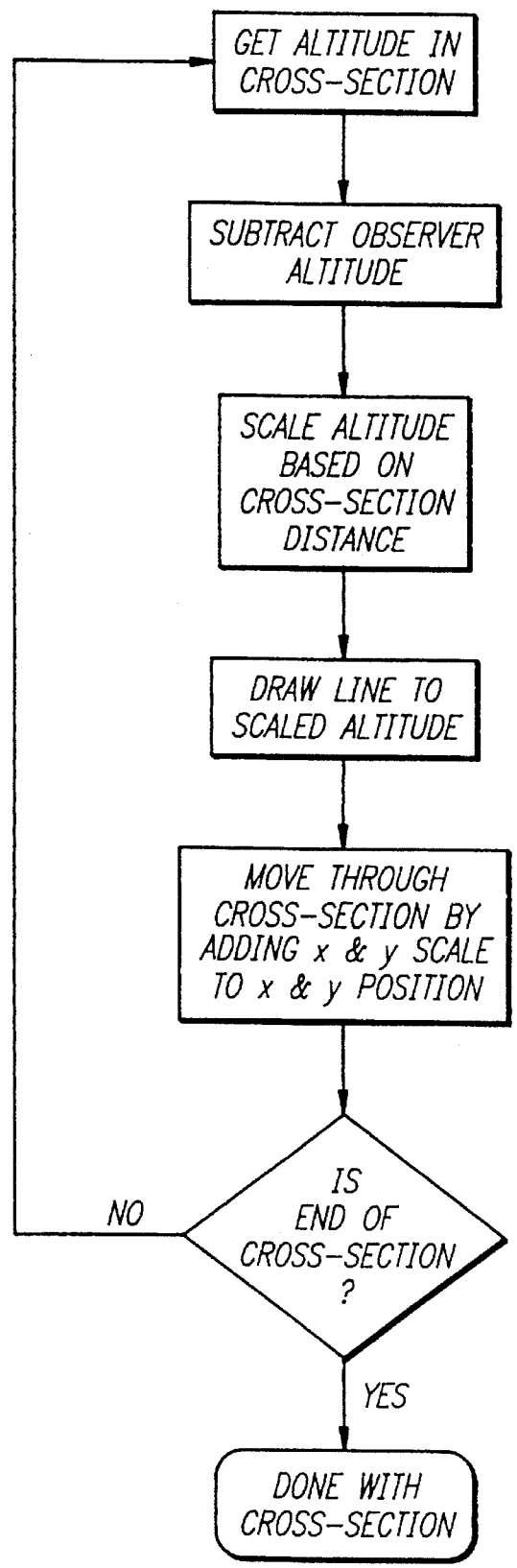
FIG. 4 is a block diagram of the cross-section generator portion of the image generator.

With this background established, the technique of the present invention may be described alternatively as follows. FIGS. 3 and 4 are flow charts representative of the technique of the present invention. Reference may also be taken to the following table (Table I) and the Appendix to the within specification, both of which, taken together, represent summarily the process which is explained below. In the listing set forth in the Appendix, segments of the program are delineated by labeled brackets to indicate the operations performed, and the labels are summarized in Table I below.

TABLE I

PROGRAM OPERATIONS

| | |
|---|---|
| A | Allocate memory for data. |
| B | Load data into memory. |
| C | Clear the screen buffer |

TABLE I-continued

PROGRAM OPERATIONS

| | | |
|---|---|---|
| D | Get observer position and heading. | |
| E | Using cross-section scale and distance, compute X and Y components of scale and position. | |
| F | Draw left side of cross-section. | |
| G | Draw right side of cross-section. | |
| H | Repeat process (D–F) for remaining cross-sections. | |

Before an image can be generated, the instant image generation technique needs several pieces of information.

(1) Though a display buffer could be of virtually any size, a typical display buffer could be 320 by 200 elements. In the software listing of Appendix A, the display buffer is identified as Display(x,y) where x is the X-coordinate of the display and y is the Y-coordinate of the display.

(2) Three-dimensional data (also known in the software game art as the "gaming area") is stored in a two-dimensional array of elevations and colors. Typical arrays would be 4096×4096 elements in size and are here identified as Elevations (x, y) and Colors (x, y).

(3) The position of the observer is identified as Observer_x, Observer_y, Observer_z, and the heading of the observer as Observer_heading.

(4) The number of cross-sections is chosen based on an inverse relation between the speed of the given hardware and the quality of the image desired. A typical number n of cross-sections would be n=1024.

(5) For correct perspective, the vertical scaling of cross-sections farther from the observer should be smaller. The distance of each cross-section from the observer, which distance is pre-selected, is stored in an array identified as Cross_distance(n) where n is the number of a given cross-section. The scale of each cross-section, likewise pre-selected, is stored in an array identified as Cross_scale(n). The scale should represent the number of elevation elements seen by one display element at the distance of the cross-section. This is necessary in order to represent on the display device the angle of the field of view of an imaginary human observer.

From the above information, the present image generation technique can construct an image by drawing all of the desired cross-sections. For each cross-section, the following steps are taken by the image generator.

(1) Compute the position of the center of the cross-section relative to the gaming area. In the equations which follow, it will be appreciated that the variable Observer_heading corresponds with the angle $\Omega$ as defined above.

position_x=Observer_x+COS(Observer_heading)*Cross_distance(n)

position_y=Observer_y+SIN(Observer_heading)*Cross_distance(n)

(2) Compute the two-dimensional scale vector needed to draw the cross-section perpendicular to the observer. In the following two equations, the angle (Observer_heading+90 degrees) corresponds to the angle ($\Omega$+90 degrees) as defined above.

scale_x=COS(Observer_heading+90 degrees)*Cross_scale(n)

scale_y=SIN(Observer_heading+90 degrees)*Cross_scale(n)

(3) For each display column, scale the elevation stored at Elevations(position_x,position_y) and draw a line to the scaled height in the color stored in Colors(position_x, position_y).

Scaled_height=Elevations(position_x,position_y)/Cross_scale(n)

For each display column to the left of center, add the scale vector to the position in the gaming area.

position_x=position_x+scale_x position_y=position_y+scale_y

For each display column to the right of center, subtract the scale vector from the position in the gaming area.

position_x=position_x-scale_,x position_y=position_y-scale_y

After all of the cross-sections are computed and plotted, the image generator has finished an image which is then displayed. Should the observer move, another image is generated as rapidly as possible using the observer's new position and heading.

The process may be more summarily described as follows, though the reader should bear in mind that not all of the operations mentioned must be performed in the order stated. The observer's position and heading are sampled. The screen buffer is cleared. The processor (not shown) gets the observer's position and heading. The processor gets the cross-section scale and distance. The processor computes the first cross-section, and generates X and Y scale factors and X and Y positions. The processor gets elevation data from the visual data base 10. The processor subtracts the observer's height (Z-data). The processor scales the height. The processor draws a line to the scaled height. The processor moves through the first cross-section by adding X- and Y-scale data to the X- and Y- position. The process is then repeated for the second and all subsequent cross-sections until all cross-sections have been created. Finally, the processor displays the image thus created on the screen of the display device.

It should be appreciated that the invention may be easily implemented in either software or hardware.

APPENDIX

'Image Generator for 320 × 200 display accessed with LINE draw function

A
```
x = 4095: y = 4095: cross.sections = 1024
DIM Elevations(x,y)
DIM Colors(xy)
DIM Cross.distance(cross.sections)
DIM Cross.scale(cross.sections)
```

B
```
LOAD "Elevation Data" into Elevations( )
LOAD "Color Data" into Colors( )
LOAD "Cross-Section Data" into Cross.distance( ) and Cross.scale( )
```

'Clear Screen Buffer

-continued

APPENDIX

C — CLS

D
```
'Observers position in the gaming area
Observer.x = 16
Observer.y = 16
Observer.altitude = 0
Observer.heading = 0
```

E
```
'generate image
FOR n = 1 TO cross.sections
scale.x = COS((Observer.heading + 90))*Cross.scale(n)
scale.y = SIN((Observer.heading + 90))*Cross.scale(n)
cross.x = Observer.x + COS(Observer.heading)*Cross.distance(n)
cross.y = Observer.y + SIN(Observer.heading)*Cross.distance(n)
```

F
```
'draw left side of cross-section
position.x = cross.x : position.y = cross.y
FOR screen.pos = 159 TO 0 STEP -1
position.x = position.x + scale.x
position.y = position.y + scale.y
cross.elevation = Elevations(position.x, position.y) + Observer.altitude
scaled.height = cross.elevation/Cross.scale(n)
LINE (screen.pos, 0) - (screen.pos, scaled.height), Colors(position.x, position.y)
NEXT screen.pos
```

G
```
'draw right side of cross-section
position.x = cross.x : position.y = cross.y
FOR screen.pos = 160 TO 319 STEP 1
cross.elevation = Elevations(position.x, position.y) + Observer.altitude
scaled.height = cross.elevation/Cross.scale(n)
LINE (screen.pos, 0) - (screen.pos, scaled.height), Colors(position.x, position.y)
position.x = position.x - scale.x
position.y = position.y - scale.y
NEXT screen.pos
```

H
```
'repeat until all cross-sections are drawn
NEXT n
```

What is claimed is:

1. A method of realtime generation of perspective visual scenes reflective of a virtual observer's movement through a gaming area generated from a visual data base, comprising:

generating a series of overlapping perspective cross-sections perpendicular to a virtual observer's line of sight, including:

(a) determining a desired horizontal scale, vertical scale, position, heading and height of the virtual observer relative to the visual data base, a desired number of perspective cross-sections and distance of each respective perspective cross-section from the heading, position and height of the virtual observer;

(b) identifying a sampling point for the first perspective cross-section in the perspective visual scene of the gaming area;

(c) computing a two-dimensional scale vector with direction perpendicular to the observer's line of sight and with magnitude scaled according to the distance of the respective perspective cross-section from the virtual observer;

(d) for each display column to the virtual observer's left of the virtual observer's line of sight, adding the scale vector to the sampling point;

(e) obtaining elevation data at said sampling point from a visual data base;

(f) for each display column, scaling the elevation data stored at a respective point in said data base and drawing a line to the scaled elevation;

(g) repeating steps (d), (e) and (f) until all display columns to the virtual observer's left have been drawn;

(h) for each display column to the virtual observer's right of the virtual observer's line of sight, adding the negative of said scale vector to said sampling point;

(i) obtaining elevation data from the visual data base;

(j) for each display column, scaling the elevation data stored at a respective point in said data base and drawing a line to the scaled elevation;

(k) repeating steps (h), (i) and (j) until all display columns to the virtual observer's left have been drawn;

(l) repeating steps (b) through (k), inclusive until all of the overlapping series of perspective cross-sections have been generated; and displaying the display columns of the overlapping cross-sections that are not overdrawn by the display columns of an overlapping cross-section.

2. The method of claim 1 in which said step of determining the desired horizontal scale, vertical scale, number of perspective cross-sections desired, and distance of each respective perspective cross-section from the virtual observer comprises applying algorithmic functions to the virtual observer's position, heading and height.

3. A method for generating perspective visual scenes during computer game play, comprising:

generating a series of overlapping perspective cross-sections perpendicular to a virtual observer's line of sight, including:

(a) determining desired horizontal scale, vertical scale, number of perspective cross-sections desired, and distance of each respective perspective cross-section from the virtual observer;

(b) computing a center point for the first perspective cross-section;

(c) computing a two-dimensional scale vector with direction perpendicular to the virtual observer's line of sight and with magnitude scaled according to the distance of the respective perspective cross-section from the observer;

(d) determining the length of an increment by adding the scale vector to the centerpoint for positions to the left of the centerpoint and adding the negative of the scale vector to the centerpoint for positions to the right of the centerpoint;

(e) stepping a single increment from said center point along a line determined by the angle and direction of said scale vector and said predetermined distance of the respective perspective cross-section from the virtual observer;

(f) drawing a display column on the perspective cross-section at the position determined in step (e), comprising:

obtaining elevation data from a visual data base; and scaling the elevation data stored at a respective point in said data base and drawing a line to the scaled elevation;

(g) repeating steps (d) through (f), inclusive, until all display columns on the perspective cross-section have been drawn;

(h) repeating steps (b) through (g), inclusive, until all of the perspective cross-sections have been computed and drawn; and displaying the display columns of the overlapping cross-sections that are not overdrawn by the display columns of an overlapping cross-section.

4. The method of claim 3 in which said step of determining the desired horizontal scale, vertical scale, number of perspective cross-sections desired, and distance of each respective perspective cross-section from the virtual observer comprises applying algorithmic functions to the virtual observer's position, heading and height.

5. An apparatus for generating and displaying real-time visual images of perspective scenes, comprising:

a memory;

a display for displaying the perspective scenes; and a processor that:
  (a) determines, in real-time, position and heading data of a virtual observer relative to a visual data base stored in the memory,
  (b) determines a perspective visual scene visible to the virtual observer from the position and heading data,
  (c) divides the visual scene into a series of overlapping perspective cross-sections, with each perspective cross-section being perpendicular to the position and heading of the virtual observer and located at a greater distance from the position of the virtual observer than the preceding perspective cross-section,
  (d) determines a scale for each perspective cross-section according to the distance of each of the perspective cross-sections to the virtual observer,
  (e) determines a sampling point for each perspective cross-section,
  (f) computes a two-dimensional scale vector for each perspective cross-section with direction perpendicular to the virtual observer's line of sight and with magnitude scaled according to the distance of the respective perspective cross-section from the observer,
  (g) determines the position of each display column by adding the scaled vector to the sampling point for each display column to the left of the sampling point and adding the negative of the scale vector to the sampling point for each display column to the right of the sampling point,
  (h) obtains elevation data from the visual data base and scales the elevation data as a function of the position of each display column and the scale of the perspective cross-section,
  (i) generates column draw signals associated with each display column of the scaled perspective cross-section, the column draw signals being a function of the position of each display column and the scaled elevation data, and
  (j) provides the column draw signals to the display for controlling the display to draw a scaled display column on the display, wherein the portion of the scaled display column not overdrawn by the scaled display column of another perspective cross-section is displayed.

6. The apparatus of claim 5, further comprising:

address means responsive to virtual observer position and heading data and incremental X- and Y-steps for generating a value corresponding to a data base address of elevation data in the visual data base;

memory means responsive to said value corresponding to the data base address of the elevation data for generating instantaneous terrain elevation data;

wherein the processor further determines virtual observer height data relative to the visual data base stored in the memory;

subtractor means responsive to said terrain instantaneous elevation data and virtual observer height data for generating a value corresponding to the difference between virtual observer height and terrain elevation; and vertical scaling means responsive to said value corresponding to the difference between virtual observer height and terrain elevation for supplying the column-draw signal to the display.

7. The apparatus of claim 6, further comprising memory means responsive to virtual observer position and heading data and incremental X- and Y-steps for generating color data.

8. A method of generating perspective visual scenes reflective of a virtual observer's movement through a gaming area generated from a visual data base, comprising:

generating a series of overlapping perspective cross-sections perpendicular to a virtual observer's line of sight, horizontally and vertically scaling each of the series of overlapping cross-sections dependent upon a distance from the virtual observer, including:

(a) determining a desired horizontal scale, vertical scale, position, heading and height of the visual observer relative to the visual data base, a desired number of perspective cross-sections and distance of each respective perspective cross-section from the heading, position and height of the virtual observer;

(b) identifying a sampling point in the perspective visual scene of the gaming area by computing a center point for each perspective cross-section;

(c) computing a two-dimensional scale vector for each perspective cross-section with direction perpendicular to the observer's line of sight and with magnitude scaled according to the distance of the respective perspective cross-section from the virtual observer;

(d) drawing a line in each display column of each perspective cross-section, including:

(i) determining the position of the display column by adding the scale vector to the sampling point for display columns to the left of the virtual observer's line of sight and adding the negative of the scale vector to the sampling point for display columns to the right of the virtual observer's line of sight;

(ii) obtaining elevation data at said sampling point from a visual data base;

(iii) scaling the elevation data stored at a respective point in said data base and drawing a line to the scaled elevation;

(iv) repeating steps (i), (ii) and (iii) until all the display columns of the perspective cross-sections of the visual scene have been drawn.

9. The method of claim 8 in which said step of determining the desired horizontal scale, vertical scale, number of perspective cross-sections desired, and distance of each respective perspective cross-section from the virtual observer comprises applying algorithmic functions to the virtual observer's position, heading and height.

* * * * *

UNITED STATES PATENT AND TRADEMARK OFFICE
CERTIFICATE OF CORRECTION

PATENT NO. : 5,550,959
DATED : August 27, 1996
INVENTOR(S) : Kyle G. Freeman

It is certified that error appears in the above-indentified patent and that said Letters Patent is hereby corrected as shown below:

Claim 6, Column 10, Line 30, change "terrain instantaneous", to read --instantaneous terrain--.

Signed and Sealed this

Third Day of December, 1996

BRUCE LEHMAN

Attest:

Attesting Officer

Commissioner of Patents and Trademarks